US012639080B2

(12) United States Patent
Rothgerber et al.

(10) Patent No.: US 12,639,080 B2
(45) Date of Patent: May 26, 2026

(54) AUTOMATED AND VALIDATED COMPUTER DEVICE FOR DISABLING OR ENABLING OF DEVICE OPTIONS ON A DISPLAYED DIALOG BOX MENU WITHOUT USER INPUT

(71) Applicant: Raytheon Company, Waltham, MA (US)

(72) Inventors: Brent A. Rothgerber, Tucson, AZ (US); Nicholas Norwood, Tucson, AZ (US); Lucy Perrotta, Andover, MA (US); Kareem D. Elsaw, McKinney, TX (US); Raymond E. Kneip, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 100 days.

(21) Appl. No.: 18/375,783

(22) Filed: Oct. 2, 2023

(65) Prior Publication Data

US 2025/0110751 A1     Apr. 3, 2025

(51) Int. Cl.
*G06F 9/00* (2018.01)
*G06F 9/4401* (2018.01)
*G06F 13/10* (2006.01)

(52) U.S. Cl.
CPC ............ *G06F 9/4411* (2013.01); *G06F 13/10* (2013.01); *G06F 2213/40* (2013.01)

(58) Field of Classification Search
CPC ........... G06F 9/4411; G06F 13/10; G06F 9/00
See application file for complete search history.

(56) References Cited

U.S. PATENT DOCUMENTS

| | | | |
|---|---|---|---|
| 5,974,546 A * | 10/1999 | Anderson | ........... G06F 11/2284 726/1 |
| 8,051,476 B2 | 11/2011 | Mcardle | |
| 9,336,393 B2 | 5/2016 | Bhansali | |
| 9,846,584 B1 | 12/2017 | Khoruzhenko | |
| 10,198,270 B2 * | 2/2019 | Cooper | ................. G06F 9/4401 |
| 11,238,160 B2 * | 2/2022 | Kallenberg | ........... G06F 21/572 |
| 2013/0127591 A1 | 5/2013 | Shay | |
| 2017/0199776 A1 * | 7/2017 | Dasar | .................... G06F 11/079 |
| 2019/0303578 A1 | 10/2019 | Robison | |
| 2023/0198775 A1 * | 6/2023 | Liu | ........................ G06F 21/575 |

OTHER PUBLICATIONS

Disable Hardware on Sparc Platforms from the OBP, Blog O'Matty, online , Jul. 25, 2008, 5 pp. (Year: 2008).*
International Search Report for PCT Application No. PCT/US2024/049610 dated Mar. 4, 2025.

* cited by examiner

*Primary Examiner* — Tammara R Peyton
(74) *Attorney, Agent, or Firm* — Getz Balich LLC

(57) ABSTRACT

A method of operation is provided during which a plurality of hardware devices of a computer are disabled on a firmware level during a reboot of the computer in response to receiving a disable command prior to the reboot. A validation is run to determine whether or not the hardware devices are disabled. A validation signal is provided indicative of whether or not the hardware devices are validated as being disabled.

17 Claims, 4 Drawing Sheets

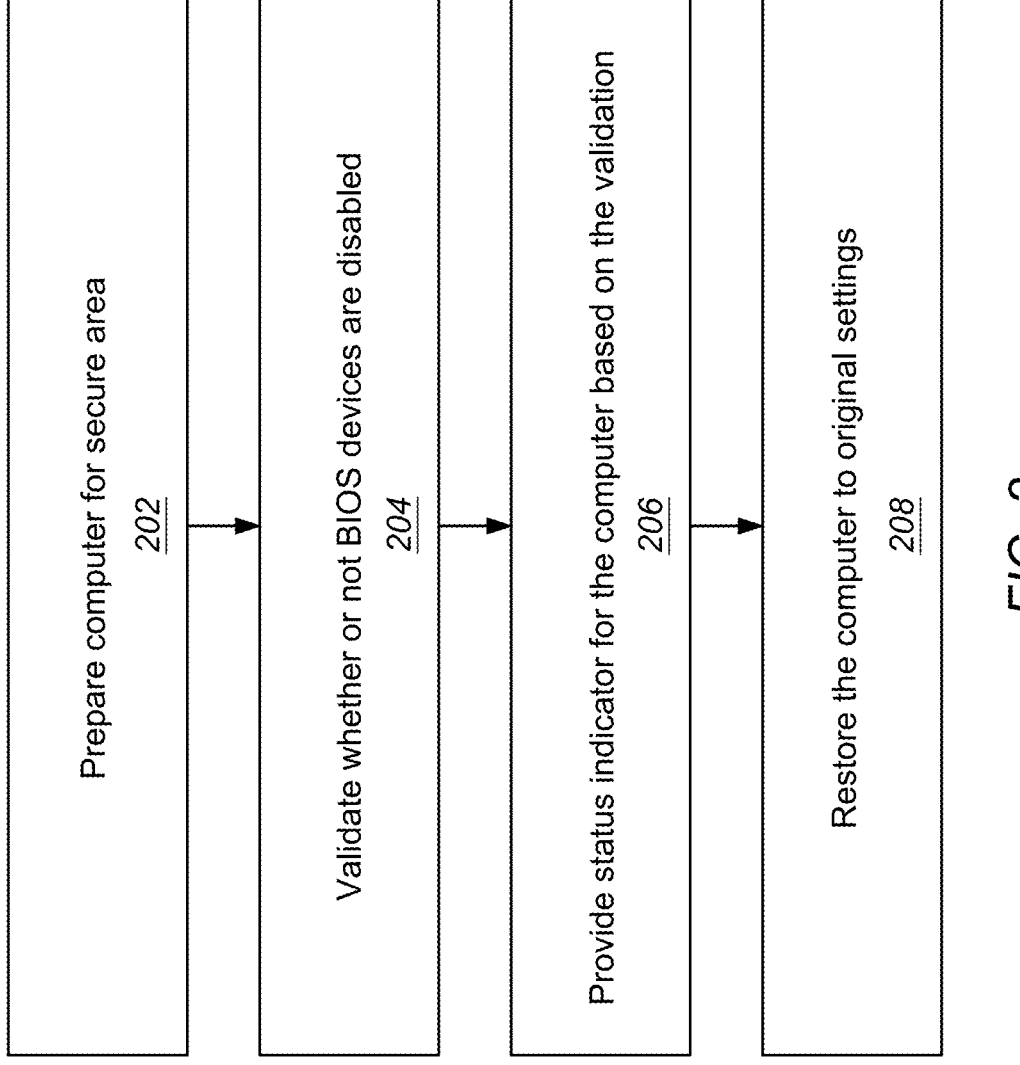
Prepare computer for secure area
202
Validate whether or not BIOS devices are disabled
204
Provide status indicator for the computer based on the validation
206
Restore the computer to original settings
208
*FIG. 2*
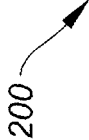
200

AUTOMATED AND VALIDATED COMPUTER DEVICE FOR DISABLING OR ENABLING OF DEVICE OPTIONS ON A DISPLAYED DIALOG BOX MENU WITHOUT USER INPUT

BACKGROUND OF THE DISCLOSURE

1. Technical Field

This disclosure relates generally to a computer and, more particularly, to disabling/enabling devices of the computer.

2. Background Information

A computer may include various devices/hardware such as a camera, a Wi-Fi transceiver and a camera. Under certain circumstances, there may be a need to disable certain computer devices. While the computer devices may be manually disabled, manually disabling computer devices is time consuming and prone to mistakes; e.g., forgetting to disable one or more computer devices particularly where multiple computer devices are to be disabled. There is a need in the art therefore for improved methods and apparatuses for disabling computer devices.

SUMMARY OF THE DISCLOSURE

According to an aspect of the present disclosure, a method of operation is provided during which a plurality of hardware devices of a computer are disabled on a firmware level during a reboot of the computer in response to receiving a disable command prior to the reboot. A validation is run to determine whether or not the hardware devices are disabled. A validation signal is provided indicative of whether or not the hardware devices are validated as being disabled.

According to another aspect of the present disclosure, another method of operation is provided during which a subset of a plurality of basic input output system/unified extensible firmware interface devices of a computer are disabled on a firmware level during a reboot of the computer in response to receiving a disable command. The subset of the basic input output system/unified extensible firmware interface devices is predetermined and independent of a user selection. A validation is run to determine whether or not the subset of the basic input output system/unified extensible firmware interface devices are disabled. An indication is presented to a user of whether or not the subset of the basic input output system/unified extensible firmware interface devices have been validated as being disabled.

According to still another aspect of the present disclosure, an apparatus is provided which includes a computer. The computer includes a plurality of hardware devices, a user interface and a display. The computer is configured to disable the hardware devices on a firmware level during a reboot of the computer in response to receiving a disable command prompted by a user through the user interface. The computer is configured to run a validation to determine whether or not the hardware devices are disabled following the reboot. The computer is configured to visually present an indication on the display of whether or not the hardware devices have been validated as being disabled.

The hardware devices may be or include one or more communication devices of the computer.

The hardware devices may be or include one or more operational hardware devices of the computer.

The hardware devices may be or include one or more basic input output system (BIOS) devices of the computer.

The hardware devices may be or include one or more unified extensible firmware interface (UEFI) devices of the computer.

The hardware devices may include a camera, a microphone and a wireless signal transmitter and/or receiver.

The hardware devices may be predetermined and independent of a selection by the user.

The subset of the basic input output system/unified extensible firmware interface devices may include one or more communication devices of the computer.

The computer may include a plurality of computer devices. The hardware devices may form a subset of the computer devices.

The hardware devices may include: a camera; a microphone; and/or a wireless signal transmitter and/or receiver.

The method may also include automatically selecting the computer devices to be disabled independent of a user input.

The method may also include preventing a user from changing which of the computer devices are to be disabled in response to receiving the disable command.

The method may also include: displaying a dialog box with a disable devices option; and providing the disable command upon a user selection of the disable devices option. The dialog box may also be displayed with an enable devices option.

The validation may run following each reboot of the computer.

The method may also include displaying an indication on a screen of the computer based on the validation signal. The indication may be indicative of whether or not the hardware devices are validated as being disabled.

The indication may include a textual message and/or a graphic selected based on the validation signal.

The indication may be or otherwise include a banner on the screen.

The method may also include deploying a countermeasure where tampering with the computer to falsely indicate the hardware devices are validated as being disabled is detected.

The method may also include enabling the hardware devices on the firmware level during a second reboot of the computer in response to receiving an enable command prior to the second reboot.

The computer may be configured as or otherwise include a mobile computer.

The computer may be configured as or otherwise include a laptop computer.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 2 is a flow diagram for operating a computer.

DETAILED DESCRIPTION

The present disclosure includes methods and apparatuses for facilitating compliance with entering and/or working within a secure area (e.g., a secure closed area) such as a sensitive compartmented information facility (SCIF) room. For example, when working in the secure closed area with a computer, certain hardware and/or functionalities of that computer may need to be disabled to prevent purposeful and/or inadvertent gathering and/or transmission of information discussed, presented and/or otherwise available within the secure closed area. The methods and the apparatuses of the present disclosure facilitate (e.g., automated) disabling of the computer hardware and/or functionalities. The methods and the apparatuses of the present disclosure provide (e.g., tamperproof) validation that (e.g., all of) the computer hardware and/or functionalities which should be disabled to meet closed area regulations are disabled. The methods and the apparatuses of the present disclosure may also facilitate (e.g., automated) enabling of the computer hardware and/or functionalities which were previously disabled when outside of the secure closed area.

Figure 1:
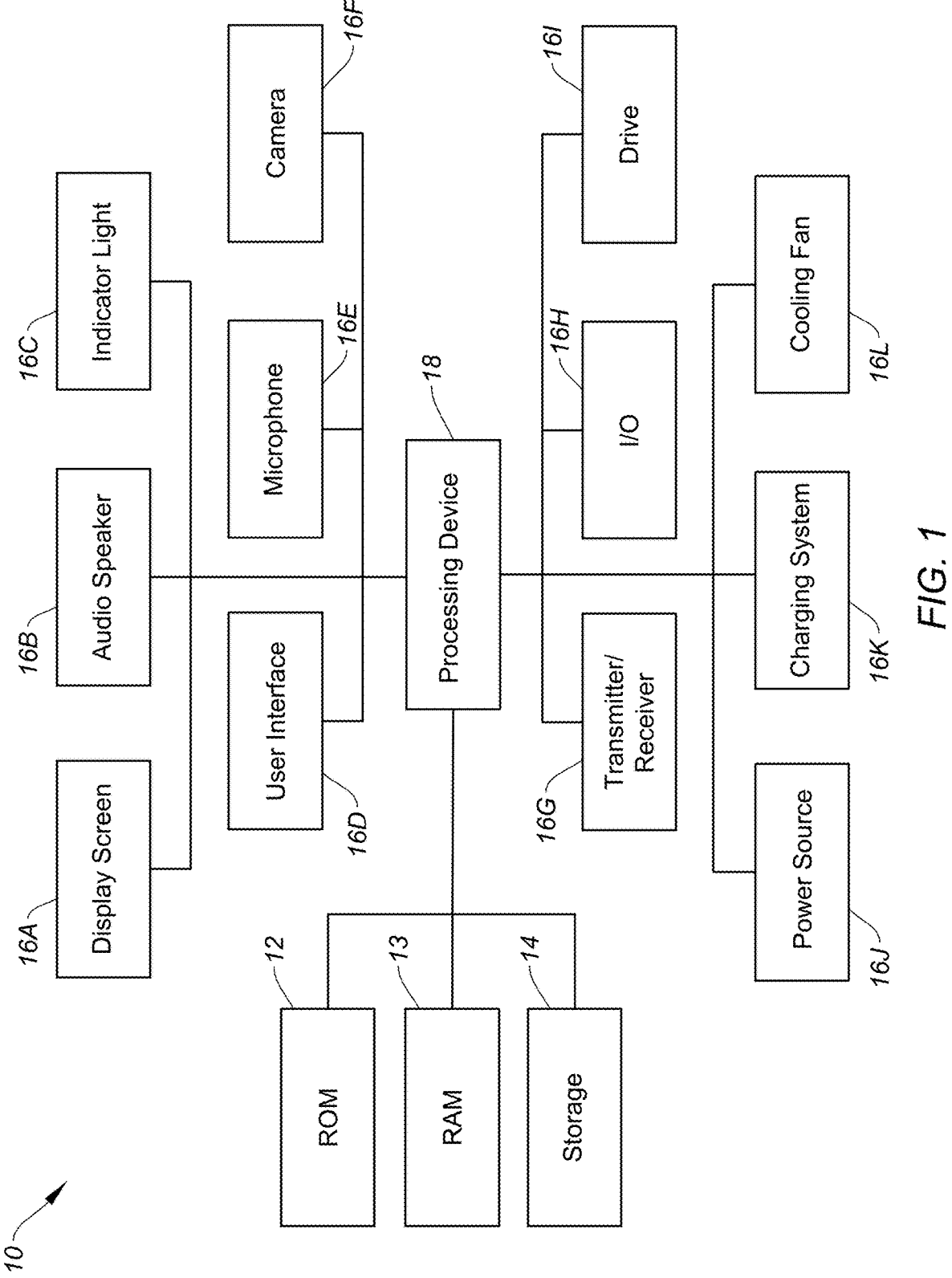
FIG. 1 is a schematic illustration of a computer.

FIG. 1 schematically illustrates an exemplary computer 10; e.g., a personal computer. This computer 10 may be a stationary computer or a mobile computer; e.g., a portable computer. The term "stationary" may describe a computer which (e.g., solely) utilizes an external electrical power source (e.g., an electrical outlet) outside of the computer for operation. An example of the stationary computer is a desktop computer. The term "mobile" may describe a computer which includes and utilizes an internal electrical power source (e.g., a battery) inside of the computer for operation. The mobile computer, however, may also utilize an external electrical power source during one or more select modes of operation; e.g., while recharging the internal electrical power source. An example of the stationary computer is a laptop computer. The present disclosure, however, is not limited to such exemplary computer types or configurations. It is contemplated, for example, the mobile computer may alternatively be configured as a tablet computer, a smart phone or a personal digital assistant (PDA) computer. The computer 10 of FIG. 1 includes one or more memories 12-14, a plurality of basic input output system (BIOS) and/or unified extensible firmware interface (UEFI) devices 16A-L (generally referred to as "16") (computer hardware devices), and a processing device 18.

The memories 12-14 are configured to store software (e.g., program instructions) for execution by the processing device 18, which software execution may control and/or facilitate performance of one or more operations such as those described below. The memories of FIG. 1 include an electrically erasable programmable read-only memory (EE-PROM) 12, a random access memory (RAM) 13 and a storage memory 14 (e.g., a hard drive). A basic input output system (BIOS) or unified extensible firmware interface (UEFI) software for the computer 10 may be stored in the EEPROM 12. An operating system software for the computer 10 may be stored in the RAM 13. Various other software applications may be stored in the ROM 12, the RAM 13 and/or the storage memory 14. Computer files and other data may also be permanently stored in the storage memory 14.

The BIOS/UEFI devices 16 include devices which are controlled, enabled, disabled and/or otherwise operated by and/or using the BIOS/UEFI software. These BIOS/UEFI devices 16 include multiple communication devices (e.g., 16A-I) as well as multiple operational hardware devices (e.g., 16J-L). Examples of the communication devices include, but are not limited to:
    a display screen 16A;
    an audio speaker 16B;

an indicator light 16C;
    a user interface 16D such as a keyboard, a touch screen, a switch, etc.;
    a microphone 16E;
    a camera 16F;
    a transmitter and/or a receiver 16G (e.g., a transceiver) for transmitting and/or receiving wireless signals such as a Wi-Fi signal, a Bluetooth signal, a cellular signal, a near field communications (NFC) signal, etc.;
    an input and/or output (I/O) port 16H such as a USB port, a micro-USB port, a telecommunications port (e.g., an ethernet port), etc.; and/or
    a drive 16I such as a disk drive, a CD drive, a DVD drive, etc.
Examples of the operational hardware devices include, but are not limited to:
    the internal electrical power source 16J;
    an electrical charging system 16K; and/or
    a cooling fan 16L.
The BIOS/UEFI devices 16, of course, may also include various other computer hardware devices. Moreover, the BIOS/UEFI software may also control operation of the memories 12-14.

The processing device 18 may include one or more single-core and/or multi-core processors. The processing device 18 and its processors are arranged in signal communication with the memories 12-14 and the BIOS/UEFI devices 16.

FIG. 2 is a flow diagram 200 for operating a computer. For ease of description, the operating method 200 of FIG. 2 is described below with reference to the computer 10 of FIG. 1 as well as with reference to operation of the computer 10 within a secure closed area. The operating method 200 of the present disclosure, however, is not limited to such an exemplary computer nor to operating within a secure closed area. The operating method 200 of the present disclosure, for example, may also be utilized in other private, business and/or government operating environments.

In step 202, the computer 10 is prepared to enter and operate within the secure closed area; e.g., the operating environment. For example, prior to entering the secure closed area, a user may launch a BIOS/UEFI control application on the computer 10. Upon launching, referring to FIG. 3, the BIOS/UEFI control application may display a dialog box 20 on the display screen 16A with one or more options. The options of FIG. 3 include a disable device option 22 (labeled as "Disable BIOS Devices" in FIG. 3) and an enable device option 24 (labeled as "Enable BIOS Devices" in FIG. 3). In this step 202, the user selects the disable device option 22 using the user interface 16D to provide a (e.g., single) disable command to the BIOS/UEFI control application. Upon receiving the disable command, the BIOS/UEFI control application flags select BIOS/UEFI devices 16 to be disabled on a firmware level using the BIOS/UEFI interface. The BIOS/UEFI control application then signals the computer 10 to reboot; e.g., restart, shutdown and then startup, etc. During the reboot, the BIOS/UEFI software applies changes to the select BIOS/UEFI devices 16 on the firmware level, where the select BIOS/UEFI devices 16 cannot be enabled using the operating system software following the reboot. For example, by disabling the select BIOS/UEFI devices 16 on the firmware level using the BIOS/UEFI software, the operating system may not have access to the disabled BIOS/UEFI devices 16. Rather, to enable the select BIOS/UEFI devices 16, the computer 10 needs to be rebooted as described below in further detail. By contrast, where a computer device (e.g., one of the BIOS/UEFI devices 16) is disabled using the operating system software (e.g., disabling a microphone or camera using a button on a computer keyboard), a user or a program running on the operating system may inadvertently and/or purposefully enable the computer device without a computer reboot or, in some instances, user knowledge thereof.

The select BIOS/UEFI devices 16 may be a subset of the BIOS/UEFI devices 16. Which BIOS/UEFI devices 16 are included in the subset may be predetermined to meet or exceed regulations associated with entering and/or working within the secure closed area; e.g., the operating environment. Where the select BIOS/UEFI devices 16 form the predetermined subset of the BIOS/UEFI devices 16, the BIOS/UEFI control application may prevent the user from changing which of those BIOS/UEFI devices 16 are included in the predetermined subset. The BIOS/UEFI control application, for example, may not grant and/or otherwise provide the user access to unselect one or more of the select BIOS/UEFI devices 16 from being disabled and/or select one or more additional BIOS/UEFI devices 16 to be disabled. The BIOS/UEFI control application, for example, may be a closed application which cannot be modified by the user. The BIOS/UEFI control application may thereby automatically select which of the multiple BIOS/UEFI devices 16 are the select BIOS/UEFI devices 16 independent of user input; e.g., without a selection made by the user.

The select BIOS/UEFI devices 16 (e.g., the predetermined subset of the BIOS/UEFI devices 16) may include any one or more of the communication devices (e.g., 16A-I). The select BIOS/UEFI devices 16, for example, may include the camera 16F, the microphone 16E and/or the wireless signal transmitter and/or receiver 16G.

In step 204, a validation of whether or not the select BIOS/UEFI devices 16 are successfully disable is performed; e.g., run. For example, during and/or following the reboot of the computer 10, the BIOS/UEFI control application may determine if each of the select BIOS/UEFI devices 16 is currently disabled. A validation signal may then be provided based on the validation. This validation signal may be indicative of whether or not the select BIOS/UEFI devices 16 are successfully validated as being disabled. The validation signal, for example, may be a positive validation signal indicating that each of the select BIOS/UEFI devices 16 is successfully disabled. Alternatively, the validation signal may be a negative validation signal indicating that one or more of the select BIOS/UEFI devices 16 is/are not successfully disabled; e.g., is/are currently enabled. This validation may be performed each time the computer 10 is rebooted, for example whether or not the reboot is prompted by the BIOS/UEFI control application or otherwise.

Figure 4:
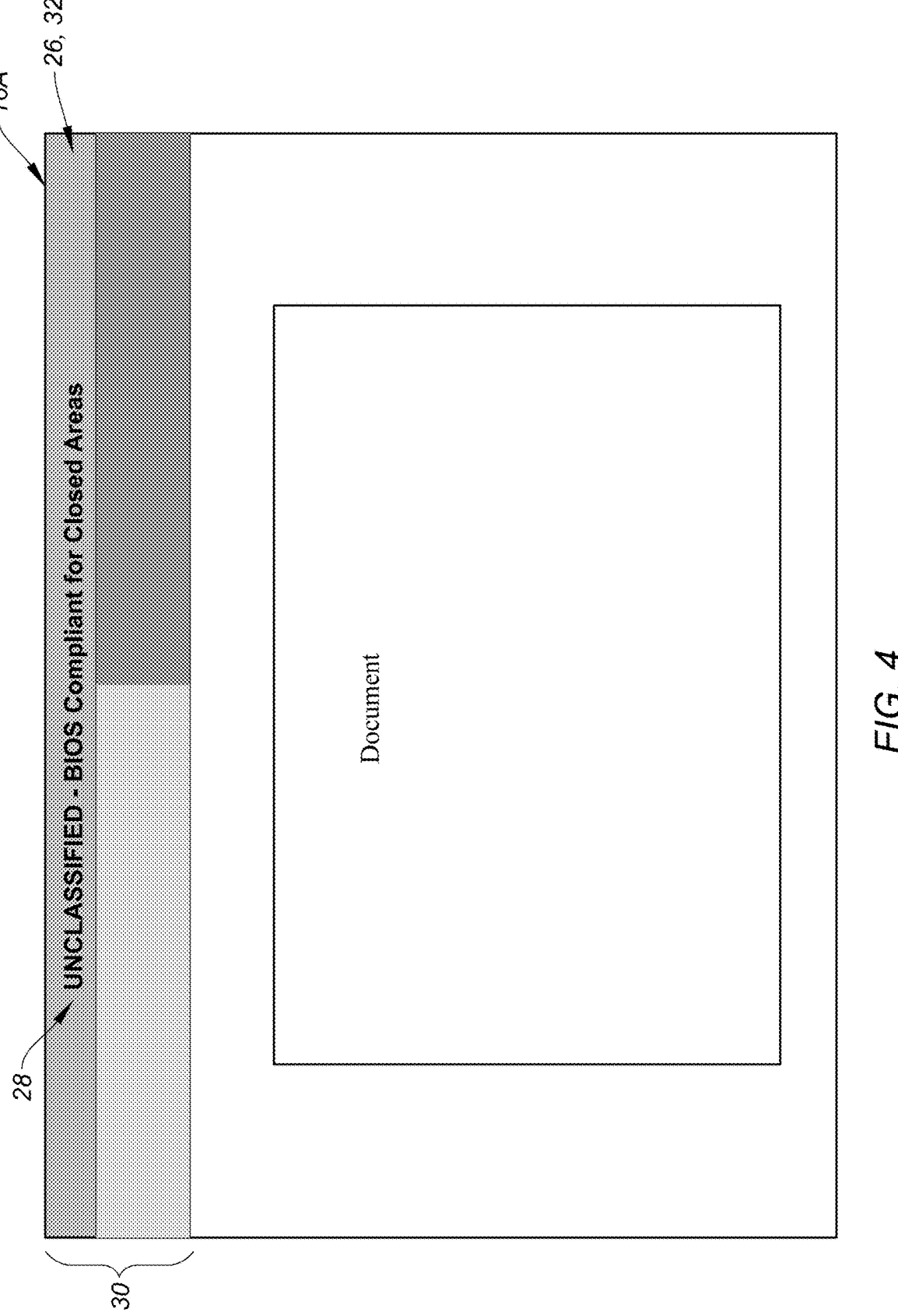
FIG. 4 is an illustration of the screen displaying a banner indicating validated disabling of devices via firmware.

In step 206, referring to FIG. 4, an indication 26 is provided regarding a status of the computer 10. For example, the indication 26 may be a positive indication indicating (e.g., communicating) to the user and/or other individuals (e.g., security personnel) that the select BIOS/UEFI devices 16 have been successfully validated as being disabled and the computer 10 complies with or exceeds the regulations for use in the secure closed area; e.g., the operating environment. Alternatively, the indication 26 may be a negative indication indicating to the user and/or other individuals that the select BIOS/UEFI devices 16 have not been successfully disabled and the computer 10 does not comply with the regulations for use in the secure closed area.

The indication 26 may be provided using the display screen 16A. This indication 26 may be displayed in the form of a textual message 28 and/or a graphic 30. The indication

26 of FIG. 4, for example, is displayed on the display screen 16A as a banner 32. Here, the banner 32 is located at a top of the display screen 16A; however, the banner 32 may be elsewhere located in other embodiments. The banner 32 may include a first textual message and/or a first graphic where the validation signal is a positive validation signal. The first textual message, for example, may indicate that the computer 10 is operating with its select BIOS/UEFI devises disabled, is secure closed area compliant, etc. The first graphic may be green or another color associated with compliance. On the other hand, the banner 32 may include a second textual message and/or a second graphic where the validation signal is a negative validation signal. The second textual message, for example, may indicate that the computer 10 is not operating with its select BIOS/UEFI devises disabled, is not secure closed area compliant, etc. The second graphic may be red or another color associated with non-compliance, which second graphic is different than the first graphic. In some embodiments, it is contemplated the non-compliant indication may be similar to the compliant indication (e.g., only with a different color and/or other slight graphical change) such that only those with knowledge know that the computer 10 is non-compliant.

Figure 3:
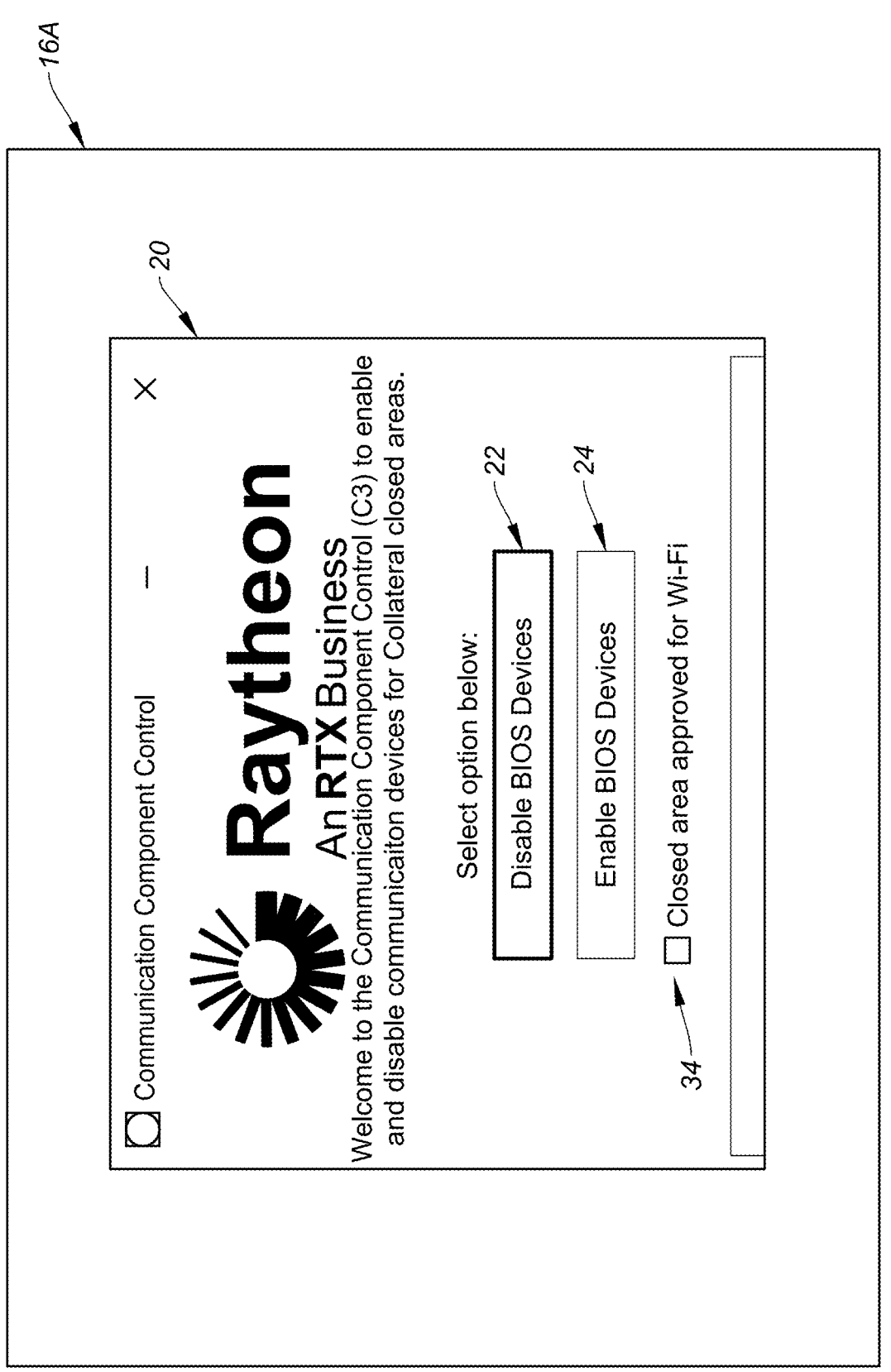
FIG. 3 is an illustration of a screen displaying a dialog box for firmware level disabling/enabling.

In step 208, the computer 10 may be restored to original settings. For example, following removal of the computer 10 form the secure closed area (e.g., the operating environment), the user may launch the BIOS/UEFI control application again on the computer 10. Referring to FIG. 3, the BIOS/UEFI control application may again display the dialog box 20 on the display screen 16A with the disable device option 22 (labeled as "Disable BIOS Devices" in FIG. 3) and the enable device option 24 (labeled as "Enable BIOS Devices" in FIG. 3). In this step 208, the user selects the enable device option 24 using the user interface 16D to provide an enable command to the BIOS/UEFI control application. Upon receiving the enable command, the BIOS/UEFI control application flags select BIOS/UEFI devices 16 to be enabled on a firmware level using the BIOS/UEFI interface. The BIOS/UEFI control application then signals the computer 10 to reboot. During the reboot, the BIOS/UEFI control application applied changes to the select BIOS/UEFI devices 16 on the firmware level using the BIOS/UEFI software. The computer 10 may then be restored to its original setting for normal operation outside of the secure closed area; e.g., the operating environment.

In some embodiments, the BIOS/UEFI control application may be configured to deploy one or more countermeasures. For example, the BIOS/UEFI control application may be configured to detect tampering where, for example, the user (or a remote outside actor) attempts to change which of the BIOS/UEFI devices 16 are selected for disabling; e.g., which of the BIOS/UEFI devices 16 are included in the predetermined subset. The BIOS/UEFI control application may also or alternatively be configured to detect displaying of a false indication (e.g., banner) on the display screen 16A intended to coverup or otherwise replace a non-compliant indication (e.g., banner) provided during the step 206. When such tampering is detected, the BIOS/UEFI control application may display another textual message and/or graphic indicative thereof. It is also contemplated the BIOS/UEFI control application may prevent any graphic, window or otherwise from covering up its compliant or non-compliant indication. Integrity valuation of C3 may also be implemented based on a digital signature and/or hash to prevent tampering.

In some embodiments, referring to FIG. 3, the user may have more than one option for disabling the BIOS/UEFI devices 16. For example, under certain circumstances, the user may be authorized for access to one or more of the BIOS/UEFI devices 16 in the secure closed area; e.g., the operating environment. The user, for example, may be authorized for access to the wireless signal transmitter and/or receiver 16G for use of the Wi-Fi (e.g., but not other wireless signals). The user may therefore check a box 34 in the dialog box 20 (labeled as "Closed area approved for Wi-Fi" in FIG. 3) such that the wireless signal transmitter and/or receiver 16G is not disabled upon selecting the disable device option 22. However, the indication 26 presented in the step 206 may indicate that the Wi-Fi on this computer 10 has not been disabled.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
  receiving, from a user of a computer, a disable command via user selection of a disable devices option of a dialog box, the dialog box comprising the disable devices option and an enable devices option;
  automatically selecting, without user input, a plurality of hardware devices to be disabled based on one or more regulations for operating the computer in a secure operating environment;
  disabling the plurality of hardware devices of the computer on a firmware level during a first reboot of the computer in response to receiving the disable command prior to the first reboot;
  running a validation to determine whether or not the plurality of hardware devices are disabled;
  providing, to the user, a validation signal indicative of whether or not the plurality of hardware devices are validated as being disabled;
  receiving, from the user, an enable command for the plurality of hardware devices, the enable command received via user selection of the enable devices option of the dialog box; and
  enabling the plurality of hardware devices on the firmware level during a second reboot of the computer in response to receiving the enable command prior to the second reboot.

2. The method of claim 1, wherein
  the computer includes a plurality of computer devices; and
  the plurality of hardware devices form a subset of the plurality of computer devices.

3. The method of claim 1, wherein the plurality of hardware devices include at least one of
  a camera;
  a microphone; or
  a wireless signal transmitter and/or receiver.

4. The method of claim 2, further comprising preventing the user from changing which of the plurality of computer devices are to be disabled in response to receiving the disable command.

5. The method of claim 1, further comprising:
  displaying the dialog box with the disable devices option.

6. The method of claim 5, wherein the dialog box is further displayed with the enable devices option.

7. The method of claim 1, wherein the validation is run following each reboot of the computer.

8. The method of claim 1, further comprising:
  displaying an indication on a screen of the computer based on the validation signal;
  the indication indicative of whether or not the plurality of hardware devices are validated as being disabled.

9. The method of claim 8, wherein the indication includes at least one of a textual message or a graphic selected based on the validation signal.

10. The method of claim 8, wherein the indication comprises a banner on the screen.

11. The method of claim 1, further comprising deploying a countermeasure where tampering with the computer to falsely indicate the plurality of hardware devices are validated as being disabled is detected.

12. The method of claim 1, wherein the computer comprises a mobile computer.

13. The method of claim 1, wherein the computer comprises a laptop computer.

14. A method of operation, comprising:
  receiving, from a user of a computer, a disable command via selection of a disable devices option of a dialog box, the dialog box comprising the disable devices option and an enable devices option;
  disabling basic input output system/unified extensible firmware interface devices of the computer on a firmware level during a first reboot of the computer in response to receiving the disable command prior to the first reboot, wherein the basic input output system/unified extensible firmware interface devices are predetermined based on one or more regulations for operating the computer in a secure operating environment and independent of a user selection;
  running a validation to determine whether or not the basic input output system/unified extensible firmware interface devices are disabled;
  presenting an indication to the user of whether or not the basic input output system/unified extensible firmware interface devices have been validated as being disabled;
  receiving, from the user, an enable command for the basic input output system/unified extensible firmware interface devices, the enable command received via selection of the enable devices option of the dialog box; and
  enabling the basic input output system/unified extensible firmware interface devices on the firmware level during a second reboot of the computer in response to receiving the enable command prior to the second reboot.

15. The method of claim 14, wherein the basic input output system/unified extensible firmware interface devices include one or more communication devices of the computer.

16. An apparatus, comprising:
  a computer including a plurality of hardware devices, a user interface and a display;
  the computer configured to receive, from a user, a disable command via user selection of a disable devices option of a dialog box on the display, the dialog box comprising the disable devices option and an enable devices option;
  the computer configured to disable the plurality of hardware devices on a firmware level during a first reboot of the computer in response to receiving the disable command prior to the first reboot, wherein the plurality of hardware devices is predetermined based on one or more regulations for operating the computer in a secure operating environment and independent of a user selection;

the computer configured to run a validation to determine whether or not the plurality of hardware devices are disabled following the first reboot;

the computer configured to visually present an indication on the display of whether or not the plurality of hardware devices have been validated as being disabled;

the computer configured to receive, from the user, an enable command for the plurality of hardware devices, the enable command received via user selection of the enable devices option of the dialog box on the display; and the computer configured to enable the plurality of hardware devices on the firmware level during a second reboot of the computer in response to receiving the enable command prior to the second reboot.

17. The apparatus of claim 16, wherein the plurality of hardware devices include a camera, a microphone and a wireless signal transmitter and/or receiver.

* * * * *